Figure 1:
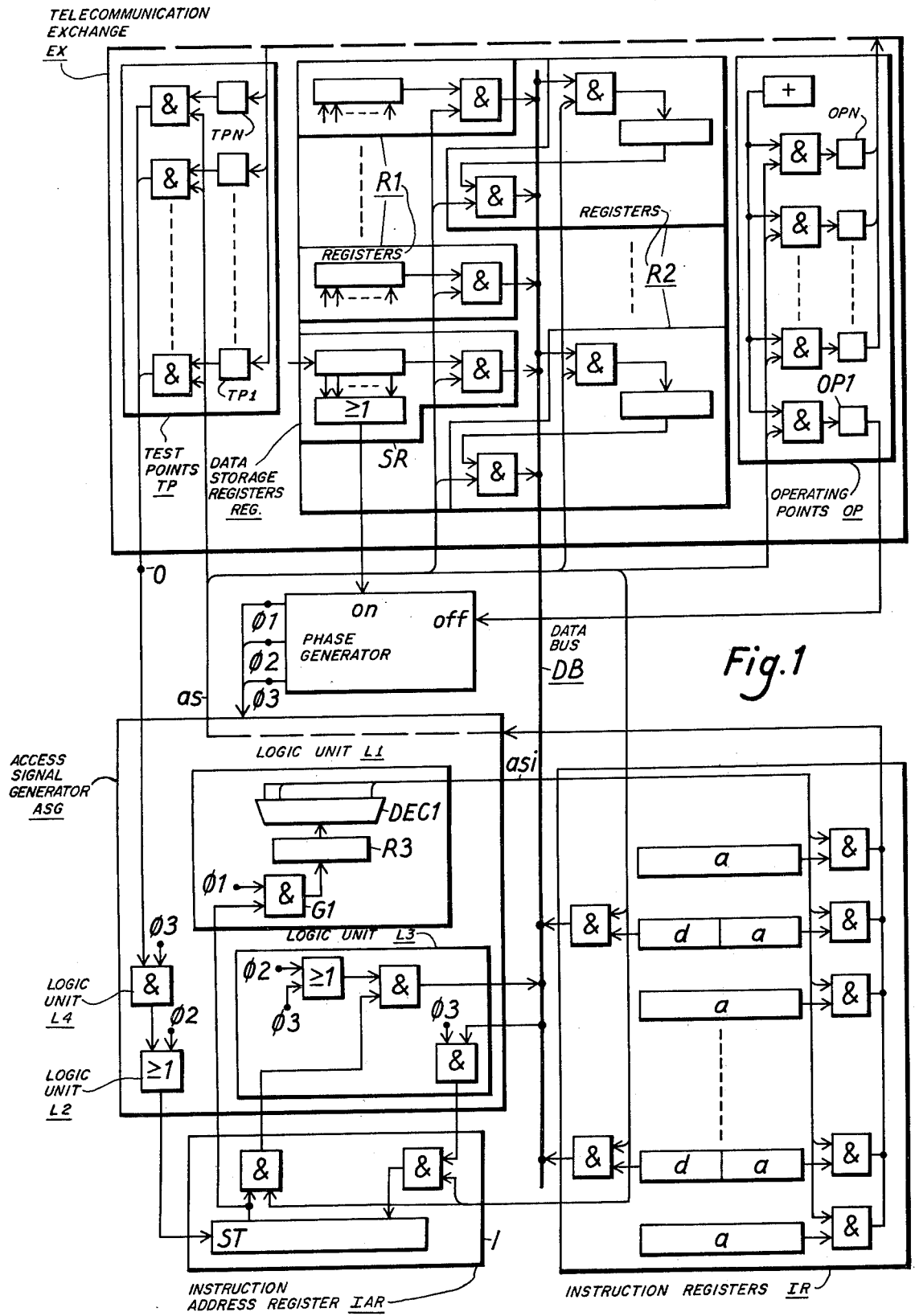

United States Patent [19]

Larsson

[11] 4,002,851
[45] Jan. 11, 1977

[54] TELECOMMUNICATION SYSTEM CONTROLLED BY STORED PROGRAM INSTRUCTIONS

[75] Inventor: Lars-Ake Evert Larsson, Huddinge, Sweden

[73] Assignee: Telefonaktiebolaget L M Ericsson, Stockholm, Sweden

[22] Filed: May 19, 1975

[21] Appl. No.: 578,734

[30] Foreign Application Priority Data

June 6, 1974 Sweden .............................. 7407431

[52] U.S. Cl. ........................................... 179/18 ES
[51] Int. Cl.² ......................................... H04Q 3/54
[58] Field of Search ................... 179/18 ES

[56] References Cited

UNITED STATES PATENTS

| | | | |
|---|---|---|---|
| 3,578,918 | 5/1971 | Lucas et al. ................. | 179/18 ES |
| 3,885,106 | 5/1975 | Deutsch .......................... | 179/18 J |

*Primary Examiner*—Thomas W. Brown
*Attorney, Agent, or Firm*—Hane, Sullivan & Spiecens

[57] ABSTRACT

A SPC-telecommunication system comprises test points, operating points, data-bus interconnected data storage registers, a phase generator and an access signal generator. The registers include instruction registers for storage of instructions, and an unit-incrementing address register for storage of addresses identifying the instructions. The phase generator produces phase signals by which the processing cycles of the instructions are divided in phases. The access signal generator is controlled by the phase signals, the addresses and the instructions. For producing access signals in order to control the test points, operating points and registers, the access signal generator includes logic arrangements or units. A first logic unit decodes the contents of the address register during the beginning phase of the respective cycle and accesses the instruction register associated with the respective address during the other phases of the cycle. A second logic unit initiates a unit incrementing of the address register during a middle phase of each cycle. A third logic unit allows transfer of an address from one of the registers to the address register only during the end phase of the respective cycle. A fourth logic unit carrying out an AND-function has its inputs activated during the end phase of a cycle for accessing one of the test points and its output connecting to the unit-incrementing input of the address register.

6 Claims, 2 Drawing Figures

Fig.2

TELECOMMUNICATION SYSTEM CONTROLLED BY STORED PROGRAM INSTRUCTIONS

The present invention relates to a SPC (Stored Program Controlled) telecommunication system in which test points, operating points and data-bus connected data storage registers are controlled by access signals which are produced in response to control instructions identified by means of instruction addresses wherein the execution of a control function consisting of a number control instructions is initiated by a start instruction address associated with the first control instruction of the control function, the start instruction address number being stored in one of the data storage registers of the telecommunication system.

Known SPC telecommunication systems as for example "D-10 Electronic Switching System", published in the journal "Japan Telecommunications Review — Vol. 13: No. 3 and 4 and Vol. 14: No. 1", consist of an exchange and a computer. The computer has a memory part and a processor. The memory part comprises a program store, a data store and registers forming a transfer unit which stores the operation instructions received from the computer for transfer to the exchange and which stores state information received from the exchange for transfer to the computer respectively. The processor which controls the processing of instructions stored in the program store comprises a number of data storage registers, an arithmetic unit and a control unit which includes a microinstruction generator with a microprogram store.

However, such a system comprising a computer is not able to operate with only so called effective instructions which are intended to control the function units of the exchange. It also requires quite a few so called ineffective instructions in order to control the computer itself. Furthermore, the computer demands the use of its own program language from which an average telecommunication expert can scarcely separate the original telecommunication control functions. The result is finally a rather confused and very complex system whose operation, maintenance and extension is overly expensive.

The present invention the characteristics of which appear from the claims proceeds from an arbitrary automatic exchange which is controlled by means of control organs as identifiers, code receivers, code senders and markers. An object of the invention is to achieve a SPC system without use of a computer program language so that as far as possible ineffective instructions are avoided. This object is achieved by inserting in the function units of the exchange simple computer technical aid means without the need to change existing approved control principles in connection with a concentration of the control of the system by means of a computer. Such computer technical means comprise data storage registers and logical arrangements controlled by time phase signals for producing access signals in order to address and activate the data storage registers which are interconnected via a data bus as well as the operating points and test points of the system.

Figure 2:
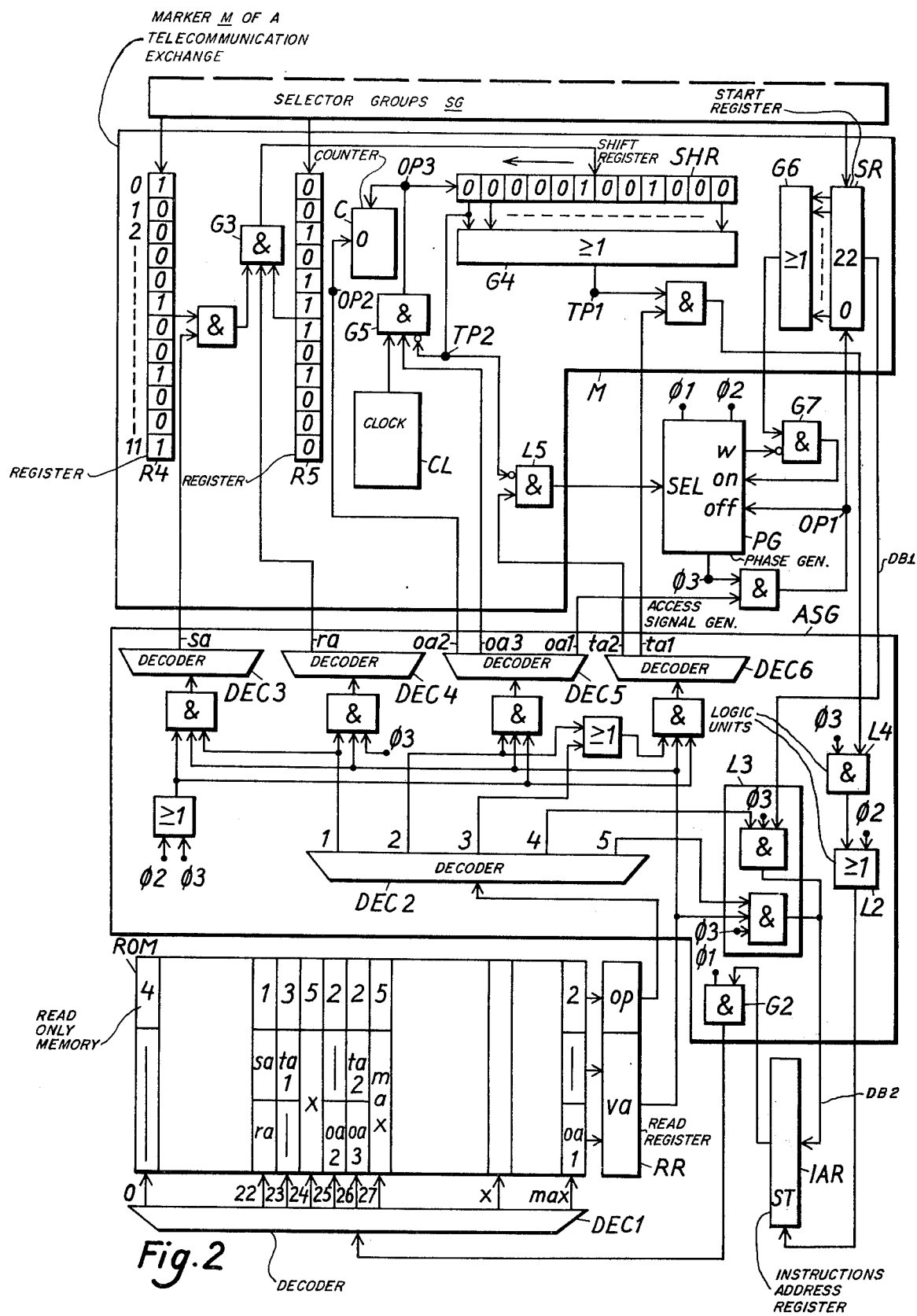

The invention is to be described in the following with reference to the accompanying drawings, where FIG. 1 shows a block diagram for a SPC system according to the invention and where FIG. 2 shows how the marker in a SPC exchange according to the invention carries out a path selection, as a control function example.

In FIG. 1 a telecommunication system EX is indicated by means of its operating points OP, test points TP and data storage registers REG. An example of an operating point is the one end of a relay winding. If a voltage is supplied this winding end the relay is energized and this constitutes an operating step in the telecommunication system. In order to adjust the telecommunication system to the high data processing rates, one can use a bistable flipflop, for example, the output of which is connected to the winding end and the input of which in this case constitutes the operating point. An example of a test point is a subscriber's line whose loop resistance is high or low. If bistable flip-flops are used, their output sides are applied as test points. By inserting data storage registers in the function units of the telecommunication system in many cases a saving of relay sets is achieved. Thus, for example the operating state of a group selector of the telecommunication system is very advantageously indicated by means of a register R1 wherein the binary contents of each bit position of the register indicates the busy and idle state, respectively, of an associated path through the selector. The installation of further registers R2 in order to, for example, transfer for further evaluation the state of the group selector to another function unit of the telecommunication system such as a marker is not difficult for a normal telecommunication expert even if he is not a data processing expert. In FIG. 1 a data bus DB is shown which interconnects all the registers other. It should be noted that there is not shown how the individual bit positions in the state registers R1, and how the operating — and test points OP, TP, respectively, are connected to the proper telecommunication units of the system. These connections are determined by the individual embodiment of each particular telecommunication system and are necessary for an understanding of the present invention.

One condition for the control of the system by means of a stored program is that each operating point, each test point and each register can be accessed by means of an associated access signal as which is transferred to a corresponding access gate. According to FIG. 1 such access signals are sent from an access signal generator ASG. It will be assumed that by means of the access gates a voltage + necessary for operation is supplied to the operating points, that the existing state of the accessed test point is connected to a common output 0 of the telecommunication system, and that the access signals of the registers distinguish whether the access signal controls the data reception or the data transmission by the register.

The control by means of a stored program is further achieved by a number of instruction registers IR and at least one instruction address register IAR with associated access gates. Each instruction register includes in binary coded form a control instruction so that the control of an arbitrarily complicated system can in principle be handled with three different kinds of instructions, namely test instructions, operating instructions and transport instructions.

A test instruction is used to access a test point TPN for the above mentioned transfer of the binary state to the common output 0. Thus a test instruction comprises the address of the test point TPN whose state will be tested.

An operating instruction is used to access and operate respectively, an operating point. Thus an operating instruction, at least includes the address of the concerned operating point OPN. In a modification of the operating instructions described later they, furthermore, comprise the address of a test point TPN. The modification consists in that the concerned operating point remains activated until the involved test point changes to a determined binary state.

A transport or transfer instruction is used to transport transfer data from one register to another via the data bus DB and associated access gates. Thus a normal transport instruction includes the address of the sending and the address of the receiving register. There are registers R2 which are accessed because of the one instruction for reception and because of the other instruction for sending data. If, however, a transport instruction addresses one of the registers R1 which store system states, this register is always only for sending data to the data bus DB. Also for the instruction registers data reception from data bus DB is impossible therefore, these registers are only read only devices. For a data transport from one of the instruction registers IR to one of the data storage registers REG in the telecommunication system or to the instruction address register IAR and since the instruction register itself is the sending register, a transport instruction is used which includes partly the data d which are to be transported and partly the address a for the receiving register. Thus the instruction registers IR and the instruction address register IAR with associated access gates are connected to data bus DB.

Addresses a appearing in the different instructions are transferred to access signal generator ASG which decodes the addresses and produces the above mentioned access signals as. The instruction registers IR and the instruction address register IAR are different from other registers of the telecommunication system because their contents are transferred not only to data bus DB for transport to another register but, moreover, to the access signal generator ASG. The instruction address register IAR is arranged only to store an instruction address i.e., a number which is associated with one of the instruction registers IAR. The access signal generator ASG decodes the instruction address numbers and produces from them the access signals asi for the address parts a stored in the instruction registers. Furthermore, the instruction address register distinguishes IAR is different from all other registers in that it is an up counter that it is provided with a stepping forward input ST whose activation causes that the stored address number be unit incremented.

Each instruction is processed step-by-step, the dividing up of a processing cycle into at least three time phases, a beginning-, a middle-, and an end phase is controlled by means of a phase generator PG, which sends corresponding time phase signals $\phi1$, $\phi2$, $\phi3$ to the access signal generator ASG. The access signal generator ASG includes a first logic unit L1 which decodes the contents of the instruction address register IAR during the beginning phases and transmits during the other time phases the access signal asi for the instruction register IR identified by means of respective instruction address number. In this manner the access signal generator ASG has to its disposal during the other time phases in respective processing cycles the address contents of the accessed instruction register.

The access signals as for activating the operating and test points and for connecting all the registers including the instruction registers and the instruction address register to the data DB bus are produced by means of further logic units of the access signal generator ASG during suitable time phases. Since it is necessary to count with building up processes it is advantageous to access the registers which receive data first during the end phases. On the contrary the registers which will send data to said data bus and the operating and test points are accessed as quick as possible.

The operation of the access signal generator is described more in detail in the following with help of an embodiment shown in FIG. 2. In the principle diagram of FIG. 1 the conversion of the addresses a received from the instruction registers to the access signals as for the sake of simplicity is indicated only by means of a dotted line. In the above mentioned first logic unit L1 the time phase control is indicated by means of a gate G1 activated during the beginning phases. Through gate G1 the instruction address numbers are written in an intermediate register R3 whose output is connected to an address decoder DEC1. Representativey for all other registers the time phase control is indicated for the instruction address register by means of a logic arrangement L3 which is activated for transferring data to data bus DB during the middle and the end phases and for reception of data from said data bus during the end phases.

The execution of a control function which consists of a number of control instructions in principle proceeds in the following manner: When nothing has to be changed at the operation state of the telecommunication system the phase generator PG sends no time phase signals and the instruction address register IAR includes the address number for a transparent instruction, a so-called opening instruction which comprises as sender address the address of a determined register in the telecommunication system, a so-called start register SR, and as receiver address the address of the instruction address register IAR. In order to understand the present invention it is not necessary to explain the method according to which an instruction address number is written into the start register, by means of which address number the first control instruction of the present control operation is to be accessed. One can install several phase generators with associated instruction registers, instruction address registers and access signal generators, if the invention is to be utilized in order to control all functions of a telecommunication system. In such case each phase generator is allotted unchangeable the processing of determined control functions which affect a limited number of operating points and test points. However, a suitable utilization of the registers REG makes the cooperation of the phase generators possible. In such cases a start register cooperating with a first phase generator is also associated with the registers cooperating with a second phase generator. When the second phase generator has, for example, finished a control function with a data transport to this start register, a control function is ordered, the execution of which is controlled by the first phase generator. On the other hand there is in each telecommunication system, irrespective of the use of data processing aids at the invention of all control functions or only a part thereof, at least one control function, the execution of which is demanded by an operation state change in the telecommunication system. If, for example, a subscriber changes the loop state of its line an instruction address number is thereby written into a start register, by means of the address number the first control instruction in the control function is accessed in order to scan all the lines.

An address number stored in the start register SR releases the start of the phase generator PG. During the beginning phase in the first processing cycle the above mentioned opening instruction is accessed wherein the address number stored in the start register SR is transported through the data bus DB1 to the instruction address register IAR, where the address number is written during the end phase of the first processing cycle. Thus, the first control instruction of the ordered control function is accessed at the beginning of the following processing cycle. It is assumed that this first control instruction concerns the operation of an operating point which consequently according to the above description is accessed and activated by the access signal generator ASG. The second control instruction in the control function initiated in this way is accessed by means of the above mentioned stepping input ST of the instruction address register IAR, which input is activated by means of an OR-gate or logic unit L2 during the middle phase in each processing cycle. In this manner during sequential processing cycles instruction addresses are obtained, the address numbers of the instruction addresses being unit incremented, and therewith access signals asi are obtained for sequential control instructions. Also during the middle phase in the processing cycle for said opening instruction such an increment of the address number was carried out, however, this increment was removed at the reception of the instruction address number belonging to the first control instruction during the respective end phase. In principle unit incrementing of the address number is negated when the instruction address register is accessed as a receiving register during a transport instruction.

This property will be used when, in connection with a test instruction, the continued execution of a control function depends on the binary state of the accessed test point. The output 0 of the telecommunication system previously mentioned common for all test points is connected to an AND-gate or logic unit L4 which is activated during the end phases and the output of which is connected through said OR-gate L2 to the stepping input ST of the instruction address register IAR. In this manner it depends on the binary state of the test point whether the contents of the instruction address register during respective processing cycle is unit incremented once or twice. The incremented address number in comparison with a test instruction address number is often allotted to a transport instruction so that a new instruction address number is transported through the data bus DB2 to the instruction address register IAR. Thus after a test instruction there is branch to one of two possible instruction sequences. When the proper control function of the telecommunication system is executed a transport instruction is accessed by means of a normal address number incrementing during the middle phases so that, due to the transport instruction, the instruction address register receives, during the end phase, an instruction address number which is one unit less than the address number of the above mentioned opening instruction and which is associated with an operating instruction, a so-called stop instruction. By means of the stop instruction an operating point OP1 is accessed during the end phase the activation of which stops the phase generator PG. Earlier, however, during the middle phase in the instruction address register IAR the address number associated with the opening instruction was obtained.

By means of FIG. 2 and by means of the embodiment that a marker M in an automatic exchange there will be described the execution of a path selection. As parts of the marker two registers R4 and R5, a clock CL, a counter C, some gates and a shift register SHR are shown, the cooperation of which will be explained more in detail below. The start register SR, the instruction address register IAR and the phase generator PG are already described with respect to FIG. 1. Instead of a central data bus the individual connections as DB1, DB2, . . . , etc. data transports are shown in FIG. 2 because in this way, it is easier to explain the execution of the path selection control function. Instead of the individual instruction registers there is provided a read only memory ROM equipped with an address decoder DEC1 and a read register RR.

The construction of the access signal generator ASG depends on the coding form which is chosen for the immediately accessable control instructions stored in the read only memory. The instructions consist of an operator and a variable part op and va respectively. The variable part includes the addresses for the registers, the test and operating points which are to be controlled and data which are to be transported to one of the registers, respectively. As it already appears from the principle description the difference between effective and ineffective instructions explained in the introduction is mainly manifested in the different transport instructions. The instructions which access the instruction address register IAR either for data reception or data sending are ineffective because they do not immediately produce proper control of the telecommunication system. The operator part in such ineffective transport instructions is associated in the embodiment showed in FIG. 2 with individual operating code numbers. Besides the code numbers 1, 2 and 3 respectively for the effective transport-, operating- and test instructions respectively the code numbers 4 and 5 respectively are used for the data transport from the start register SR and from the variable part of the read register RR, respectively, to the instruction address register IAR. This means that no variable part in combination with the code number 4 is necessary because that the code number already defines the sending and the receiving register, and this means that for an instruction with the code number 5, the whole variable part is available for the instruction address number which is to be transported.

The access signal generator ASG comprises: for decoding the code number or op codes, an operator decoder DEC2 which is connected to the operator part of the read register RR; and, for decoding the addresses of the register, test- and operating points of the telecommunication system, a sending, a receiving, an operating and a test decoder DEC3 to DEC6 which, through associated activating gates, are connected to the phase generator PG, to the operator decoder and to the variable part of the read register RR. In a transport instruction with the code number 1, for example, the one with the address number 22 in the read only memory ROM, the one variable half part comprising n bit positions is for the sending addresses sa, and the other likewise n positions comprising the other half is for the receiving addresses ra. The insertion of the code number 5 means that the instruction address register IAR as well as the start register SR comprise 2.n bit positions and that it is possible to execute control functions with altogether $2^{2n}$ control instructions when using a sufficiently large read only memory and therewith to control data transfers betweem $2^n$ registers in the telecommunication system. The variable parts of test instructions with the code number 3, for example the one with the address number 23 in the read only memory, include only test point addresses ta, so the existing bit positions per se allow an access of $2^{2n}$ test points. IF it is assumed that no operating point OP needs to be activated beyond the end of the respective processing cycle, the variable parts of the operating instructions with the code number 2, for example the one with the address number 25 in the read only memory, are only used for the operating point addresses oa and per se there is also access possibility for $2^{2n}$ operating points. With the embodiment shown in FIG. 2 it is, however, possible to make the processing cycles of the operating instructions independent of the time phase singals of the phase generator PG. This is achieved by providing the phase generator PG with a signal extension input SEL and with such operating instructions with code number 2, for example the one with the address number 26 in the read only memory, having one variable part comprising the operating point address oa which is decoded by the operating decoder DEC5, and another variable comprising the address ta2 of a suitable test point TP2 which address is decoded by the test decoder DEC6, and which test point changes its binary state when the operating process is finished. An activation of of the signal extension input SEL by logic unit L5 in response to the above stated conditions in an extension of the time phase signal just transmitted from the phase generator until the binary state of the likewise accessed test point TP2 can change. As much modified operating instructions include two addresses, by one access signal generator with access signals produced for only $2^n$ operating points and for only $2^n$ test points.

The registers R4 and R5 of the marker cooperate respectivey with an input selector group an output selector group of the selector groups SG comprising a number of similar groups and take part at the setting up of a new telephone connection. It is assumed that at both the input side and at the output side it is already been examined which paths in a group of for example 12 paths for the new connection may be switched in the selector groups without disturbing already existing connections. Between the concerned input and output selector groups, all paths in a number of path groups are defined by means of fast installed links. Examination results for a determined path group for the belonging associated links are stored on one hand at the input side and on the other hand at the output side in the bit positions of said registers R4 and R5, each link being associated with one of the link numbers 0 to 11 and with one bit position in each of the registers. According to the bit positions in the register R4 at the input side and according to the bit positions in the register R5 at the output side it is assumed that the links with the numbers 0, 5, 8 and 11 and the links with the numbers 2, 4, 5, 6 and 8, respectively, will be concerned with the new connection. The path selection function of the marker M is to determine one path; i. e., one link through which the new connection is to be switched.

The read outlets of said two registers are through an AND-gate arrangement G3 connected to the write inlets of the shift register SHR. For each bit position of the two registers an AND-function is carried out so that only those positions of the shift register SR are activated which correspond to coincidentally activated positions of registers R4 and R5. According to the assumed example, in the shift register SR the bit positions are activated which belong to the links with the numbers 5 and 8. The counter C which is provided with a zero input 0 for zerosetting the contents of the counter, counts the shift pulses which are fed to the shift input of the shift register SR. The zero input of the counter forms an operating point OP2. A first test point TP1 indicates by means of the output of an OR-gate G4 connected to the bit positions of the shift register if at least one of the bit positions is activated.

When the binary state of the first test point TP1 indicates that no link within the path group called for path selection is in concerned with the new connection, the path selection control function is interrupted and, by means of other control functions, the selector states at the input side and at the output side for another path group are examined. A second test point TP2 is formed of the bit position in the shift register to which position the contents of the other positions are shifted sequentially by the shift pulses which are produced by the clock CL and are received at the shift input. By means of an AND-gate G5 activated during respective operating instruction, an operating point OP3, i. e. the counter C and the shift register SHR, obtains shift pulses until the second test point TP2 is activated. Therefore according to the assumed example there will be 5 shift pulses. At the end of the path selection the counter C holds the number of the link through which the new connection is to be switched.

Starting from an idle phase generator PG and from an instruction address register IAR unactivated in all its bit positions, the execution of the path selection function is opened according to the showed example in FIG. 2 by writing the instruction address number 22 in the start register SR connected to an OR-gate G6. It is assumed that the data transfers to the start register SR as well as to the registers R4 and R5 are from the selector groups SG and refer to control functions which belong to the selector groups SG. OR-gate G6 is, via a blocking gate G7, connected to a start input on of the phase generator PG having an output w which is activated as long as the time phase signals are transmitted and which is connected to an inverting input of the blocking gate. In this manner the phase generator PG receives only a short start pulse and it is impossible to open a new control function before the just processed control function is finished. In FIG. 2, for a better comprehension, the outputs of the operating decoder DEC2 and the operating parts of the accessed control instructions are denoted by corresponding operating code numbers 1 to 5, and the outputs of the address decoder DEC1 are denoted by the instruction address numbers 0, 22 to 27, x and max applied in the example. By means of the time phase signals $\phi 1, \phi 2, \phi 3$ sent from the phase generator PG the execution of the path selection occurs sequentially. In the following operating table two digit list numbers are used, the ten digit denotes the running processing cycle number and the one digits 1, 2 and 3 denote the beginning, middle and end phases.

OPERATING STEPS

11: The instruction with the operating code number 4 associated with the address number 0 is accessed and stored in the read register RR.

12: The contents of the instruction address register IAR is by means of the stepping input ST unit incremented and the code number 4 is decoded by the operating decoder DEC2.

13: The contents of the start register SR, i. e. the address number 22 is transported to the instruction address register IAR.

21: The instruction with the operating code number 1 associated with the address number 22 is accessed and stored in the read register RR.

22: The contents of the instruction address register is unit incremented to 23, the code number 1 is decoded, and by means of the sending address sa stored in the variable part of the read register RR and decoded by the sending decoder DEC3 the register R4 of the marker M is activated to send the binary content value 100001001001.

23: By means of the receiving address ra stored in the variable part of the read register RR and decoded by the receiving decoder DEC4, the shift register SHR of the marker M is activated to receive the binary value 000001001000.

31: The instruction with the code number 3 associated with the address number 23 is accessed and stored in the read register RR.

32: The contents of the instruction address register IAR incremented to 24, the code number 3 is decoded, and, by means of the test point address ta 1 stored in the variable part of the read register and decoded by the test decoder DEC6, the first test point TP1 of the marker M is sampled.

33: The contents of the instruction address register is incremented to 25 by means of activation of the stepping input SI owing to the fact that the sampled test point TP1 is activated.

41: The instruction with the code number 2 associated with the address number 25 is accessed and stored in the read register RR. 42 and 43: The contents of the instruction address register IAR is stepped to 26, the code number 2 is decoded and by means of the operating point address oa2 stored in the variable part of the read register and decoded by the operating decoder DEC5 the zero input 0 of the counter C, i.e., the operating point OP2 of the marker M, is activated and the counter is set to zero.

51: The instruction with the code number 2 associated with the address number 26 is accessed and stored in the read register.

52: The contents of the instruction address register is stepped to 27, the code number 2 is decoded, by means of the operating point address oa3 stored in the variable part of the read register and decoded by the operating decoder DEC5, the shift input of the shift register operating point OP3 of the marker M is activated for reception of shift pulses sent from the clock CL. By means of the test point address ta2 stored in the variable part of the read register and decoded by the test decoder DEC6 the second test point TP2 of the marker is accessed, therefore the middle phase of this processing cycle is extented as a consequence of the activation of the signal extension input SEL of the phase generator PG because the second test point TP2 is unactivated. This point remains low until the shift pulses shift the content of the shift register until the register stores the value 100100000000 when the second test point changes its binary state, that is when the counter C has counted 5 shift pulses.

61: The instruction with the code number 5 associated with the address number 27 is accessed and stored in the read register.

62: The contents of the instruction address register is incremented to 28 and the code number 5 is decoded.

63: The variable part of the read register, i. e. the instruction address number max having binary 1 in all bit positions, is transported to the instruction address register IAR.

71: The instruction with the code number 2 associated with said only binary 1 comprising address number is accessed and stored in the read register.

72: The contents consisting of only binary 1 in the instruction address register is incremented one unit which is equal to a zero setting, the code number 2 is decoded and, by means of the operating point address oa1 stored in the variable part of the read register and decoded by the operating decoder DEC5, an set point OP1 is accessed in order to et to zero the start register SR and in order to stop the phase generator PG.

73: The operating point OP1 is activated.

If all the bit positions of the shift register SHR had been unactivated in the step 23, i.e. if no path within the examined path group had been concerned with the new circuit, the stepping input of the instruction address register would be not activated in step 33 and one obtains:

41: The instruction with the code number 5 associated with the address number 24 is accessed and stored in the read register.

42: The contents of the instruction address register IAR is stopped to 25 and the code number 5 is decoded.

43: The variable part of the read register, i. e. the address number x for an instruction which opens a new, however, here not described instruction sequence, is transferred to the instruction address register.

In order to limit the path selection function as far as possible from other control functions, it has according to the example been assumed that the counter C is started from zero when a new path group is examined. By means of another, not described, control function the address of the selcted link is calculated by adding the link number obtained in the counter to an address number which is associated with the link having zero as its link number. For a not shown variant, the path selection includes such adding function by charging the counter, for example, from the selector groups SG, with the address to the link with the number zero, the counter at the end of the path selection containing the address to the link through which the new circuit is to be switched.

We claim:

1. In a stored program controlled telecommunication system operating in processing cycles and having test points accessible for testing their binary state by means of test access signals, operating points accessible for activation by means of operating access signals, and data storage registers accessible for sending and receiving, respectively, data by means of data transfer access signals, control apparatus comprising: a phase signal generator means for generating series of differently phased timing signals for dividing each processing cycle into a set of different phases; an instruction address register for storing instruction addresses, said instruction address register having means for incrementing a stored instruction address in response to an incrementing control signal; instruction register means having a plurality of addressed storage registers each having an instruction address assigned thereto and each storing a control instruction; data transfer connecting means interconnecting at least some of said registers including said data storage registers; and access signal generating means connected to said phase signal generator means, to said instruction address register, to said addressed storage registers, to said test points, to said operating points and to at least some of said data storage registers and including means for generating test access signals for transfer to said test points upon receipt of test control instructions from said addressed storage registers, for generating operating access signals for transfer to said operating points upon receipt of operating control instructions from said addressed storage registers and for generating transfer signals upon receipt of transfer control instructions from said addressed storage registers, said access signal generating means further comprising a first logic means operative during at least one of the phases of the processing cycle for controlling the transfer to said means for generating the access signals of the contents of the addressed storage register whose instruction address is stored in said instruction address register, a second logic means for transmitting said incrementing control signal to said incrementing means of said instruction address register during another of the phases of the processing cycle, and third logic means operative in response to one of the control instructions for controlling the transfer of the address of one of the addressed storage registers stored in one of said registers to said instruction address register during a further phase of the processing cycle.

2. The apparatus of claim 1 wherein said access signal generating means further comprises a fourth logic means having an input connected to one of said test points for emitting said incrementing control signal to the incrementing means of said instruction address register when said one test point has a particular binary state during a predetermined phase of the processing cycle.

3. The apparatus of claim 1 wherein said phase signal generator means includes means for prolonging the duration of a phase of the processing cycle in response to a prolongation control signal, and wherein said access signal generating means further comprises fifth logic means for transmitting a prolongation control signal to said phase signal generating means when a predetermined test point has a particular binary state during the occurrence of a given access signal.

4. The apparatus of claim 1, wherein said instruction register means comprises a memory unit having a plurality of addressed registers, an output register and an address decoder means for transferring addresses from said instruction address register to said address decoder and means for transferring to said output register the contents of the addressed register whose address is received by said address decoder from said instruction address register.

5. The apparatus of claim 4 further comprising timed gating means for controlling the transfer of the address in said instruction address register to said address decoder to occur during the first phase of the processing cycle.

6. The apparatus of claim 5 wherein said output register is connected to said data transfer connecting means and to said access signal generating means.

* * * * *